United States Patent [19]

Marshall

[11] Patent Number: 4,628,534
[45] Date of Patent: Dec. 9, 1986

[54] METHOD FOR CHANGING THE RESOLUTION OF COMPRESSED IMAGE DATA

[75] Inventor: J. Nathaniel Marshall, Boston, Mass.

[73] Assignee: Honeywell Information Systems Inc., Waltham, Mass.

[21] Appl. No.: 628,698

[22] Filed: Jul. 6, 1984

[51] Int. Cl.$^4$ .............................................. G06K 9/36
[52] U.S. Cl. ...................................... 382/41; 382/47; 382/48
[58] Field of Search ............................ 382/41, 47, 56; 340/731; 358/140, 183

[56] References Cited

U.S. PATENT DOCUMENTS

| | | | |
|---|---|---|---|
| 4,499,597 | 2/1985 | Alves | 382/41 |
| 4,513,440 | 4/1985 | Delman | 382/41 |
| 4,517,604 | 5/1985 | Lasher et al. | 382/56 |
| 4,528,693 | 7/1985 | Pearson et al. | 382/47 |
| 4,566,126 | 1/1986 | Miyagawa et al. | 382/56 |

*Primary Examiner*—Anthony V. Ciarlante
*Attorney, Agent, or Firm*—George Grayson; John S. Solakian; William A. Linnell

[57] ABSTRACT

A method is disclosed for changing the horizontal and vertical resolution of an image while the image is in digitized and compressed form, where the image is first scanned and digitized to be represented as a number of discrete picture elements (pixels) and then the digitized image data is compressed. To change the resolution of an image and thereby be able to display it in smaller or larger form, the compressed image data is first analyzed and the data for certain scan lines is replicated or eliminated to respectively increase or decrease the vertical resolution of the image by a selected vertical resolution change factor. Then the compressed image data with scan lines replicated or eliminated is further processed using a selected horizontal resolution change factor to increase or decrease the horizontal resolution by respectively increasing or decreasing the number of pixels representing each scan line. The image data may also be processed so that windowing on the image may be performed.

7 Claims, 11 Drawing Figures

| Rows | |
|---|---|
| 1 | D4, L4, D4 |
| 2 | D2, L8, D2 |
| 3 | D1, L10, D1 |
| 4 | D2, L2, D5, L2, D1 |
| 5 | D9, L3 |
| 6 | D9, L3 |
| 7 | D9, L3 |
| 8 | D6, L6 |
| 9 | D2, L9, D1 |
| 10 | D1, L4, D3, L3, D1 |
| 11 | L2, D7, L2, D1 |
| 12 | L2, D7, L2, D1 |
| 13 | L2, D7, L2, D1 |
| 14 | L2, D6, L3, D1 |
| 15 | D1, L11 |
| 16 | D2, L6, D1, L3 |

COMPRESSED IMAGE DATA

*FIG. 4*

DOT PATTERN IMAGE DATA

METHOD FOR CHANGING THE RESOLUTION OF COMPRESSED IMAGE DATA

BACKGROUND OF THE INVENTION

1. Field of the Invention

The method of the present invention generally relates to a method for changing the resolution of compressed image data and more particularly a method for expanding or contracting an image which has been converted into a dot pattern by scanning and then compressed by an algorithm.

2. Description of the Prior Art

Using current digital technology, it is common practice to scan an image, which is to be either stored or displayed on a computer, to first convert the image to a dot pattern of dark and light dots by scanning the image such that the image can be displayed on a monochrome cathode ray tube type display. Often times, in order to save memory within the system in which the image is to be stored, the dot pattern data is compressed by using an algorithm such as the algorithm specified in CCITT recommendations for Group 3 and Group 4 facsimile equipment, entitled non-length encoded data compression. This algorithm is intended for black and white images of text and diagrams. This compression algorithm is generally worked by scanning along a horizontal scan line of the dot patern and counting the number of consecutive dark dots and storing that as a coded information and then once a light dot is found counting the number of light dots and storing that as coded information and so on until the complete horizontal line has been scanned before moving on to the next horizontal scan line. By coding the dot pattern in this manner, the amount of memory in the data processing system necessary to hold the image can be greatly reduced over storing the image with a bit in one state indicating a light dot and a bit in the other state indicating a dark dot. The time to transmit the image is also reduced proportionately. For example, if an image is scanned into a dot pattern consisting of 400 vertical columns and 400 horizontal rows such that there is a dot at the intersection of each vertical column and horizontal row producing a total of 160,000 dots or pixels. An image that is coded by a binary ONE representing a dark spot and a binary ZERO representing a light spot on the image would require a minimum of 160,000 bits of memory to be stored, whereas that same image when encoded could be stored in significantly fewer bits of memory when using a compression algorithm such as the CCITT algorithm.

When working with images in computer systems, it is often desirable to be able to change the resolution of the image by either expanding or contracting the resolution. In doing this resolution change, which is also known as zooming, when expanding the image, the dots within the original image are expanded into a greater number of dots in the expanded image and when contracting the image, the number of dots in the original image are reduced into a smaller number of dots in the contracted image. If the original image data is stored as compressed image data, this resolution change is normally accomplished by first changing the compressed data image into a dot pattern image data and then the dot pattern image data is manipulated to perform either the required expansion or contraction. Unfortunately, when working in this manner a large amount of memory may be required in order to take the compressed image data an expand it into the dot pattern image data. Besides requiring a large amount of data to hold the dot pattern image data in the non-compressed format, the necessity to decompress the image into the dot pattern image data also slows down the resolution change process because a large number of memory reads and writes must be performed when decompressing the compressed image data.

Performing the resolution change on the dot pattern image data has a second disadvantage. Small blocks of similar light or dark dots may be randomly reduced or expanded depending upon their exact position within the image. For example, a single dot representing a section of a narrow line may be eliminated even by slight image reductions such as 20% and has a 50% chance of being eliminated in a 2-to-1 reduction. Further, a double dot for a line may be reduced to a single dot on a random basis for reductions of less than 2-to-1 and may be eliminated altogether for reductions of greater than 2-to-1. In the case of image expansion where dots are added to the image to expand the image, the results are less than catastrophic, but a slanted line within the image, such as found in sides of a letter A, which may be two dots wide in the original image, may be randomly expanded along its length when expansion is done by processing the dot pattern image data.

Therefore, what is needed is a method for performing resolution change on compressed image data which does not require large amounts of memory, or large amounts of time, and which results in more or less uniform expansions and contractions of the image.

OBJECTS OF THE INVENTION

Accordingly, it is an object of the present invention to provide a method to expand and contract an image by manipulating compressed image data.

It is another object of the present invention to provide a method to expand or contract an image, which results in more or less uniform expansions and contractions of the image.

It is another object of the present invention to provide a method to convert an image stored as compressed image data intended to be displayed on a first display having a basic picture element of first proportions to compressed image data intended to be displayed on a second display having a basic picture element of second proportions different than the first proportions.

It is a further object of the present invention to provide a method for changing the resolution of an image which does not require large amounts of memory.

It is a yet further object of the present invention to provide a method for changing the resolution of an image which does not require large amounts of time.

It is a still further object of the present invention to provide a low cost method of changing the resolution of an image.

This invention is pointed out with particularity in the appended claims. An understanding of the above and further objects and advantages of this invention can be obtained by referring to the following description taken in conjunction with the drawings.

SUMMARY OF THE INVENTION

The above and other objects of the present invention are met by providing a method which allows for the resolution of an image stored as compressed image data to be changed directly by decoding the compressed image data a line at a time and by individually changing the dot count in each unicolor segment by multiplying the dot count by the horizontal resolution change factor. The method handles the residue from changing the resolution of individual segments by keeping an accumulative residue and using it to increment the changed dot count of a segment when necessary so that the light-to-dark and dark-to-light transitions in the image remain as nearly as possible in their proportional place within a line. When performing vertical resolution change, the compressed image data is broken down into multiple groups of lines and individual lines within each group are either eliminated or replicated depending upon whether the resolution change factor calls for contraction or expansion of the image. The lines within each group which are to be replicated or eliminated are chosen on the basis of their information content. The method further provides for the manipulation of the compressed image data to provide for a window within a total display. When performing a window operation, the compressed image data is processed a line at a time until the line count equals the first line within the window and thereafter each line is further processed so that the horizontal count of picture elements within a line fall within the beginning of the window and thereafter the data is saved until the picture element count no longer falls within the window. Subsequent lines are then processed a line at a time in a similar manner counting the picture elements until they fall within the window and then saving those elements within the window until such point that they again fall outside the window. Each line is processed in this manner until the line count no longer falls within the window area.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

The method of the present invention performs image resolution change by directly manipulating the compressed image data without requiring its decompression into a dot pattern image.

Before describing the way in which the method of the present invention is used to change the resolution of an image stored in the compressed image data format, the method of scanning an image to form a dot pattern and the method of storing a dot pattern in a non-compressed format and then a compressed format will be described.

IMAGES AS DOT PATTERNS

Figure 1:
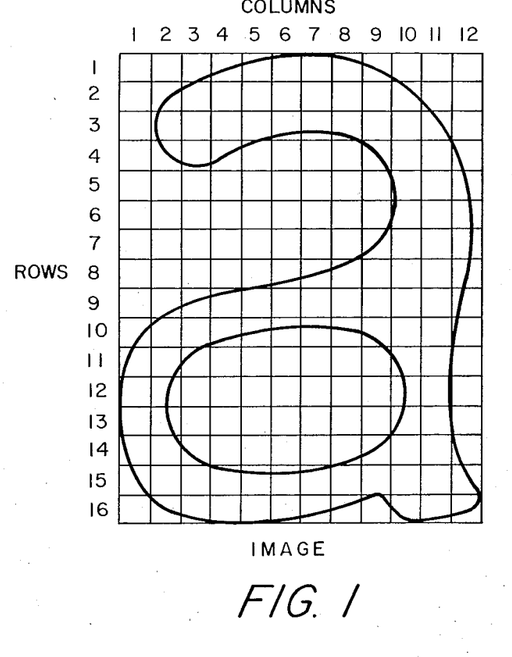
FIG. 1 is an image of a lower case letter "a" in a matrix of 12 columns and 16 rows.

FIG. 1 illustrates the image of a lower case letter "a" as it might appear in a matrix of twelve vertical columns by 16 horizontal rows. This image displayed as a dot pattern of 12 columns and 16 rows to form a light character displayed against the dark background, could be scanned and result in the dot pattern shown in FIG. 2 where each circle represents a light dot and the absence of a circle represents a dark spot on the display. If the dot pattern of FIG. 2 is to be stored in memory where a binary ZERO represents a light dot and the binary ONE represents a dark dot, the dot pattern image data would be as shown in FIG. 3 where each row of twelve bits corresponds to a row of dots in FIG. 2.

COMPRESSED IMAGE DATA

Figure 2:
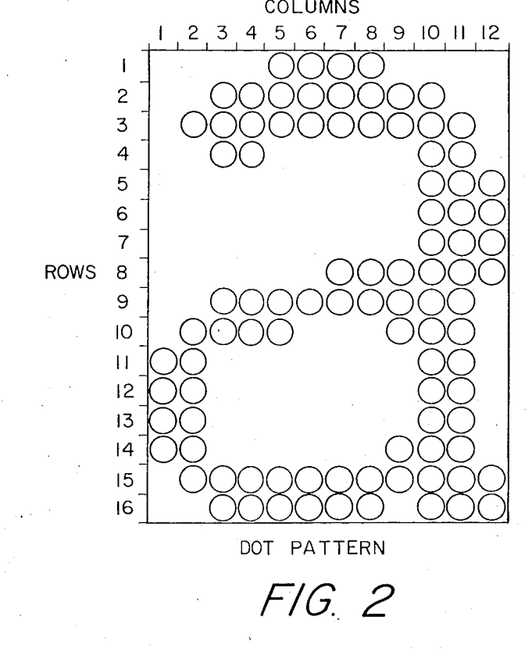
FIG. 2 is the dot pattern corresponding to the image of FIG. 1.
Figure 3:
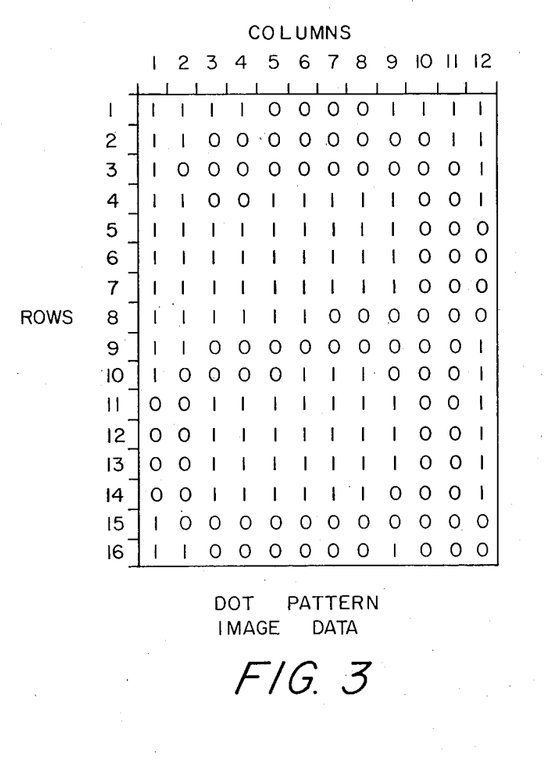
FIG. 3 is the dot pattern image data corresponding to the dot pattern of FIG. 2.
Figure 4:
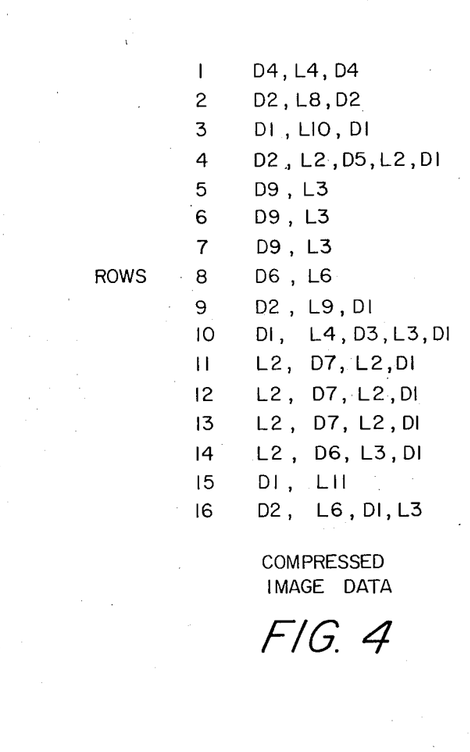
FIG. 4 is the compressed image data produced by compressing the dot pattern image data of FIG. 3.

FIG. 4 illustrates the compressed image data which corresponds to the dot pattern of FIG. 2 or the dot pattern image data of FIG. 3. The compression algorithm used to generate the compressed image data of FIG. 4 is to scan the dot pattern and generate a series of coded segments which directly represent the length of the light an dark dot strings. The codes are different for coded dark and light dot strings within FIG. 4, a dark string being represented by a "D" and a light string being represented by an "L" with the number immediately following the "D" or "L" indicating the number of dots in the string. In normal compression algorithms, a more complicated encoding scheme is used and the compression process consists of counting the lengths of strings of similar dots and using a table lookup to generate the compressed image data. The above "D" or "L" encoding scheme is used for simplicity of illustration.

As indicated above in the discussion of the prior art, normally when a resolution change is to be made upon a dot pattern, the dot pattern is either expanded or contracted by manipulating the dot pattern image data. If the image data is stored in the compressed format such as that illustrated in FIG. 4, the compressed image data is expanded to the dot pattern image data, as illustrated in FIG. 3, before the resolution change process is performed.

The method of the present invention performs the resolution change by working directly upon the compressed image data without requiring any conversion back to the dot pattern image data. When either a contraction or expansion is to be performed, the resolution change is usually done on both dimensions so that it must be performed in both the X and Y directions such that if the image is being expanded, the image must be made not only wider, but also higher. Conversely, if the image is being contracted, the image must be made not only narrower, but also shorter. Therefore, normally there are two dimensions which must be dealt with when changing the resolution of an image which results in the length of the image row being changed by either adding or subtracting columns depending upon whether the image is being expanded or contracted, respectively, and the number of rows must either be increased or decreased depending upon whether the image is being expanded or contracted, respectively.

When the compressed image data is being converted so that the image can be displayed on a different type of display than that for which the image was scanned to produce the dot pattern that was compressed, the vertical and horizontal resolutions may have to be changed by different factors. For example, if an image was scanned to produce a dot pattern that was intended to be displayed on a CRT type display having basic pixels (i.e., picture elements) with a height greater than width and the resolution is to be changed so that the image can be displayed on a flat display. (such as liquid crystal or plasma, for example) with square pixels, then the number of horizontal rows (i.e., vertical elements) in the image must be expanded by a greater factor than the number of vertical columns (i.e., horizontal elements). The method of the present invention works equally well for different vertical and horizontal resolution change factors and can therefore be used to convert an image for display on a display having different pixel proportions.

HORIZONTAL RESOLUTION CHANGE

When changing the horizontal resolution of an image, the number of dots in each row of the image must be either increased or decreased by either increasing the number of columns or decreasing the number of columns. The method of present invention does this by working directly on each line of compressed image data. To change the size of a picture by a ratio of M to N, the coded segment data is converted to a count of consecutive similar dots C and multiplied by the resolution factor M/N to get a changed count CC which is then converted back to coded segment data. For example, if an image is to be reduced in size by ⅓ by using a resolution factor of ⅔, then a line which contains 2 coded segments of a first segment of 9 consecutive dark dots, followed by a second segment of 12 light dots will result in a new image line of 6 dark dots $(9 \times (\frac{2}{3}) = 6)$ followed by 8 light dots $(12 \times (\frac{2}{3}) = 8)$.

However, since all dot counts C, when multiplied by the resolution fraction M/N will not result in an integer number of dots in the changed resolution image count CC, the fractional residues R must be handled. If the fractional residue is greater than or equal to 0.5, the next larger integer is used for the changed count CC and the amount that the changed image has gotten ahead of the original image is kept track of by subtracting one from the fractional residue and adding the difference to a cumulative fractional residue CR. If the fractional residue is less than 0.5, the changed count CC is used as is and the amount that the changed image is behind the original image is kept track of by adding the fractional residue to the cumulative fractional residue CR. Thereafter, each time an integer changed count CC is calculated, the fractional residue is added to the cumulative residue and the new cumulative fractional residue is compared to 0.5 to see if the integer changed count CC of dots in the changed resolution image should be increased by one. If the cumulative fractional residue is greater than 0.5, then one is added to the integer changed count CC before it is converted back to coded segment data and one is subtracted from the cumulative fractional residue CR.

Keeping track of the cumulative fractional residue to adjust the changed counts CC in this manner helps to maintain an overall precision change ratio of M to N with a minimum of corrective movements to individual dark-light and light-dark transitions and brings them as close as possible to their required positions in the changed resolution image while at the same time positioning the dots in discrete allowable positions within the dot matrix of a horizontal line.

By performing the image contraction or expansion process on the compressed image data, the random distortion of the image, such as line width, depending on the segment of consecutive similar dots positioned with respect to the array of dots being removed or duplicated is minimized. However, it is still desirable to further minimize the distortion that can occur when changing the resolution of image segments which result in small dot counts (i.e., when the changed count CC after processing is less than or equal to a number that is small relative to the number of dots in the horizontal row). For example, a small count SC of 3 may be used for a horizontal row having 600 dots (pixels). This problem of distortion for small dot counts is more severe on resolution reduction, but can also occur on resolution expansion.

For small changed dot counts CC. The fractional residue of the dot count is calculated with and without use of the cumulatave fractional residue CR. If the result of using the cumulative fractional residue is to reduce the changed dot count CC by one, compared with calculating the changed count CC using only the actual dot count C, then a choice must be made. Use of the cumulative fractional residue optimizes the location of the from light-to-dark or dark-to-light transition at the end of the image segment, but use of the dot count CC and the fractional residue without the cumulative fractional residue optimizes the width of the image segment, but displaces the transition at the end of the segment. The decision on whether or not to use the cumulative residue in calculating small final changed dot counts CC depends on the nature of the image. For images containing text information, the cumulative residue should be used when calculating small changed counts for image segments of the background dots (e.g., dark dots if the text is displayed as light dots on a dark background). For text dots (e.g., light dots), the small changed counts (i.e., if CC is less than or equal to a SC of 3) should be computed without use of the cumulative residue and the unused residue is carried over to the next dot segment. For example, if the resolution factor M/N is ⅔ and the previous cumulative fractional residue is −0.33 when a small light dot count C of 4 is to be changed, a preliminary changed count of 2 with a fractional residue of 0.66 will result in a final changed count CC of 3 being used instead of 2, because the fractional residue is greater than 0.5 without use of the cumulative fractional residue. The cumulative fractional residue will become −0.66 (the previous cumulative fractional residue of −0.33 plus the fractional residue of 0.66 minus 1, minus 1 because the preliminary change count CC was increased by 1). If the dot segment had been dark (a background segment), then the previous cumulative residue of −0.33 would have been used when converting the dot count of 4 and a final changed count of 2 would have resulted because the fractional residue of 0.66 would result in a new cumulative fractional residue of 0.33 which is less than 0.5 and the preliminary change count of 2 would not have been increased by 1 to produce a final change count of 3. By using the cumulative fractional residue to calculate small segment counts for all background dot segments, even if the preliminary changed count is less than SC, prevents the cumulative residue from becoming very large when alternating consecutive small segments of light and dark dot are found in a horizontal row, thus preventing the distortion of the changed resolution, which would result if the corrective effects of the cumulative residue were posponed over too many consecutive small segments.

Figure 5:
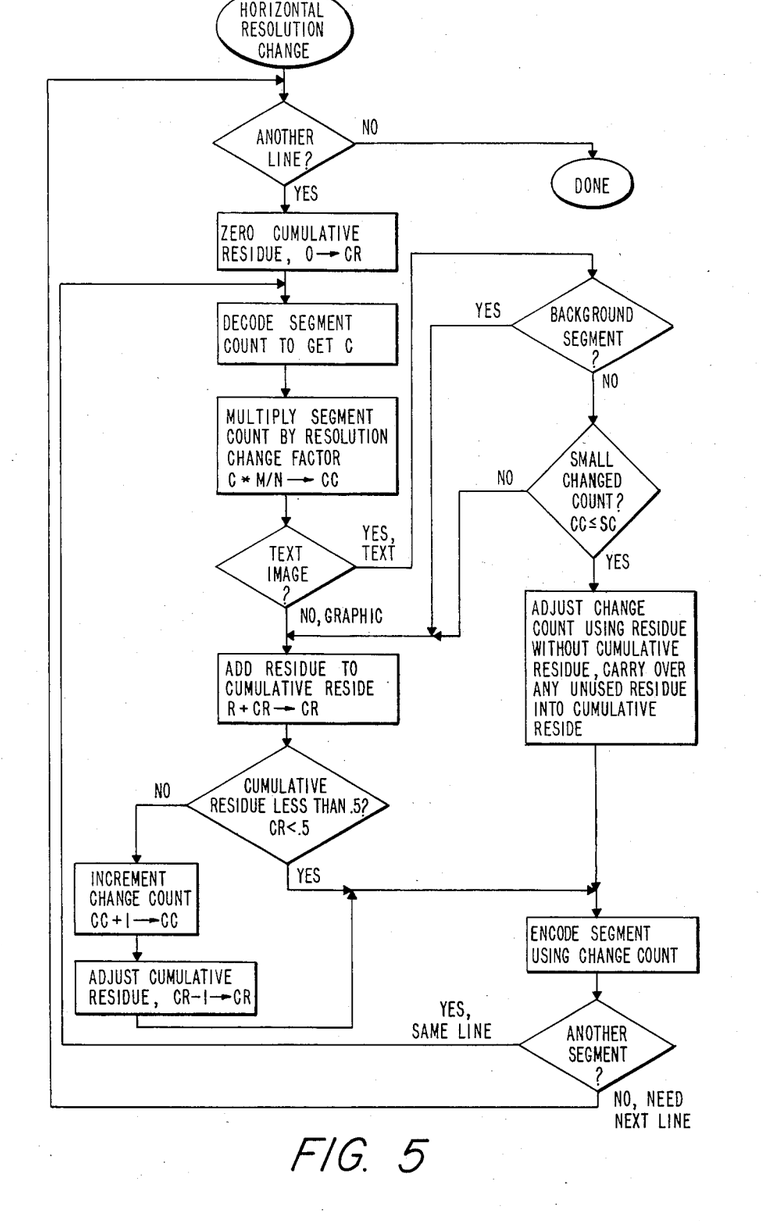
FIG. 5 is a flow chart of the method of the present invention for changing the horizontal resolution of compressed image data.

FIG. 5 illustrates a flow chart for changing the horizontal resolution of compressed image data.

VERTICAL RESOLUTION CHANGES

Changing the vertical resolution of an image basically consists of eliminating lines for size (resolution) reduction and replicating lines for size (resolution) enlargement.

If the image consists of text with some graphics, the quality of the result can be improved by attempting to retain lines with the most information in them (i.e., greatest light dot count against a dark background or greatest dark dot counts against a light background) and by replicating lines with the least information (i.e., smallest light dot count against a dark background or smallest dark dot count against a light background). This avoids loss of cross strokes in resolution (size) reduction and the introduction of excessive thickness into cross strokes in resolution (size) enlargement.

A simple algorithm for doing this is to accumulate a total background dot count for each line and when a line is reached which should be eliminated or replicated, compare that line's total background dot count with the total background dot count of predecessor lines. If the line to be eliminated or replicated has a higher total background dot count than the previous line, operate on that line (i.e., for resolution contraction, remove the line by overwriting the next line on it and for resolution expansion, replicate the line). If the line to be eliminated or replicated has a lower background dot count than the previous line, then if resolution reduction is being performed, overwrite the previous line with the line which would otherwise have been eliminated thus eliminating the previous line and saving the line with the lower background dot count. For resolution expansion, replicate the previous line and rewrite the line which would otherwise have been replicated in the next line position in the changed resolution image data thus replicating lines with the higher background dot count. For example, if the image resolution is being reduced by using a resolution factor M/N of ⅔, then instead of blindly eliminating every third line, the total background (dark) dot count of each third line (e.g., lines 3, 6, 9, 12 . . . ) is compared to the total background dot count of the previous line (e.g., lines 2, 5, 8, 11 . . . ) and the above algorithm used to determine which of the two lines is eliminated. Similarly, if for example, the resolution is being expanded by using a resolution factor M/N of 4/3, then instead of blindly replicating every third line, the total background dot count of each third line (e.g., line 3, 5, 9, 12 . . . ) is compared to the total background dot count of the previous line (e.g., line 2, 5, 8, 11 . . . ) and the above algorithm is used to determine which of the two lines is replicated.

Figure 7A:
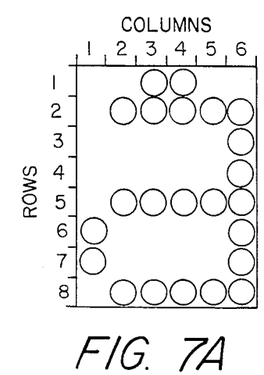
FIG. 7A is the dot pattern of FIG. 2 reduced by eliminating every other reduced horizontal row starting with row 2.
Figure 7B:
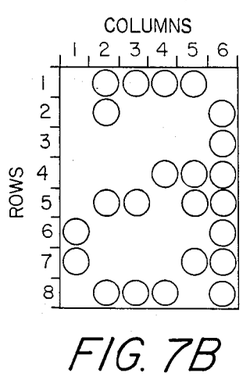
FIG. 7B is the dot pattern of FIG. 2 reduced by eliminating every other reduced horizontal row starting with row 1.
Figure 7C:
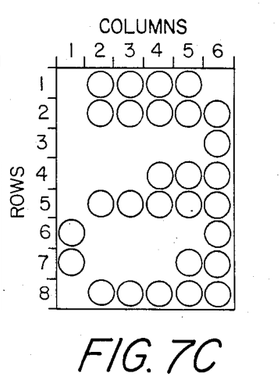
FIG. 7C is the dot pattern of FIG. 2 reduced by eliminating one reduced horizontal row in each pair of rows using the vertical resolution change method of the present invention.

FIG. 7A shows the results of using a resolution factor M/N of ½ (i.e., reduce by ½) on the image of FIG. 1 when every other line is blindly eliminated starting with line 2 (i.e., lines 2, 4, 6, 8 . . . are eliminated) and FIG. 7B shows the results when every other line is blindly eliminated when starting with line 1 (i.e., lines 1, 3, 5, 7 . . . are eliminated). FIG. 7C shows the results when the line to be eliminated within pairs of consecutive lines (i.e., lines 1 and 2, 3 and 4, etc.) is chosen by eliminating those lines with the higher total background dot count.

An extension to the algorithm would be to work with groups of 3 lines. It is always possible to divide the horizontal lines up into groups of 3 or 2 lines from which lines are to be eliminated or replicated to provide the lines which are operated on. The line pairs (i.e., groups of 2 lines) are dealt with as above. The groups of 3 are analyzed as follows. To operate on one line in the group of 3 lines, the line with the highest background dot count is chosen. To operate on 2 lines in the group of 3 lines, the line with the lowest background dot count is the line not operated on.

For any resolution change factor M/N, N may be broken into sets of triples (3s) and pairs (2s) from some or all of which lines must be added or removed. If the algorithm for 3 lines is implemented, triples are preferable in making this breakdown. For example, if the resolution change factor M/N is 7/9, then it is preferred to eliminate 2 lines (horizontal rows) in each group of 9 lines thus reducing each group to 7 lines. This elimination of 2 lines can be done by using the algorithm for 3 lines by selecting lines 2, 3 and 4 as one group of triples and lines 6, 7 and 8 as a second group of triples within each group of 9 lines and eliminating one line from each group of triples. Note that by selecting these lines to be in the triples, no case will arise where consecutive lines will be eliminated either between triples in one group of 9 lines or between the second triple of a first group of 9 lines and the first triple of a successor group of 9 lines.

Since a horizontal line of compressed image data can vary in the amount of memory required to hole the line, an image in compressed image data format is treated as a single stream of data and there is no correlation between the beginning of image lines and memory location. It is thus necessary to remember the memory address for the beginning of the lines if two lines are being worked on. Further, when any line is rewritten, there may be a need to remove gaps or make room before successor lines.

HORIZONTAL AND VERTICAL RESOLUTION CHANGES

Figure 6:
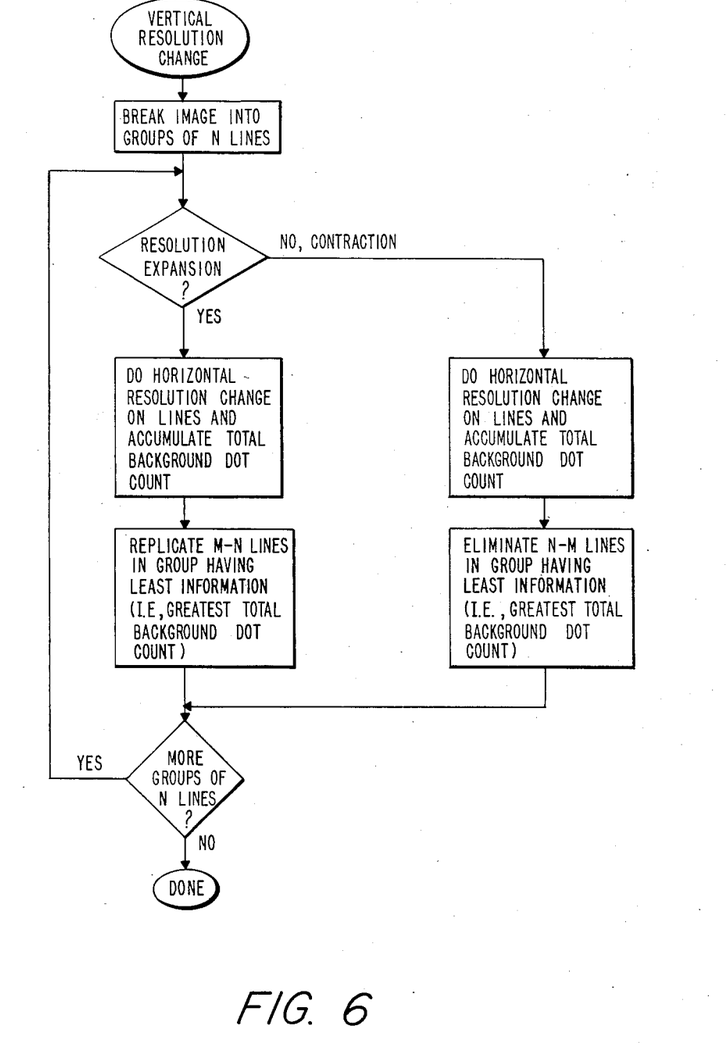
FIG. 6 is a flow chart of the method of the present invention for changing the vertical resolution of compressed image data.

Although the method of changing horizontal resolution of an image was described first, in most cases it will be preferable to perform both horizontal and vertical operations together. As a compressed horizontal line is being processed for total background dot count which is doing vertical resolution change, it may also be processed for horizontal resolution changes with some addition in processing time. After the decision is made to keep or replicate a line when doing the vertical resolution change processing, the kept or replicated line can be stored with the horizontal resolution of the lines already changed. This process, shown in FIG. 6, avoids processing the data twice—once for total dark count and once for horizontal resolution change. This appears always to be the best sequence for resolution change expansions. For resolution contractions by large factors, it may be worthwhile to process vertically including creating the total background dot counts, but postpost all horizontal resolution change until after it is known which lines are to be kept.

Some processing time could be saved by calculating a total background count for each horizontal line when the image is first compressed and storing a list of their counts along with the compressed image if the compression is done within the system.

If the image compression technique uses differentiation between successive lines, then the total background dot count is interpreted as a difference instead of the full value when implementing the above algorithms.

There is a further reason to perform vertical resolution change before horizontal resolution change, the decision as to which lines to eliminate or replicate can be done on the basis of the information content of the original image horizontal lines which provide a better basis for line selection than can the image line data after horizontal resolution change. That is, dissimilar original image lines may become similar after horizontal resolution change and therefore it is better to make the vertical resolution change decision before the original image lines are changed by the horizontal resolution change processing.

WINDOWING OF COMPRESSED DATA

Figure 8:
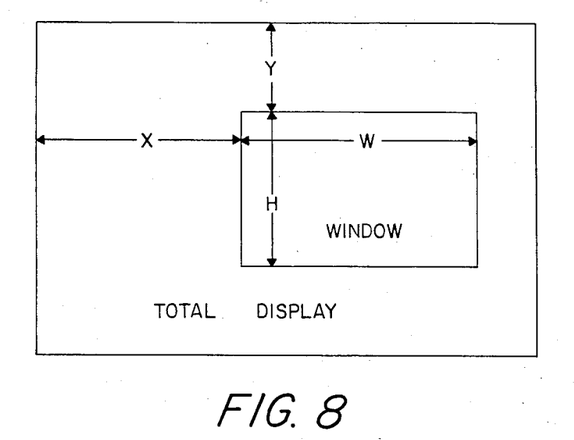
FIG. 8 is an illustration of a window within a total display.

It is possible to window (i.e., display a portion of an image as part of larger display) a section of an image by relatively simple manipulation of the compressed image data. If the upper left corner of the window is stated in x and y coordinates in dot and line counts, respectively, and the width W and height H of the window are also stated in dot and line counts, respectively (see FIG. 8), the compressed image data can be simply manipulated to obtain a compressed image of the window.

To window by manipulating compressed image data, a count of horizontal lines is maintained. Until the line count reaches Y, no data is sent and after the line count exceeds Y+H, no more data is sent. Between lines Y and Y+H some of every horizontal line is sent according to a simple dot count of x direction elements.

Figure 9:
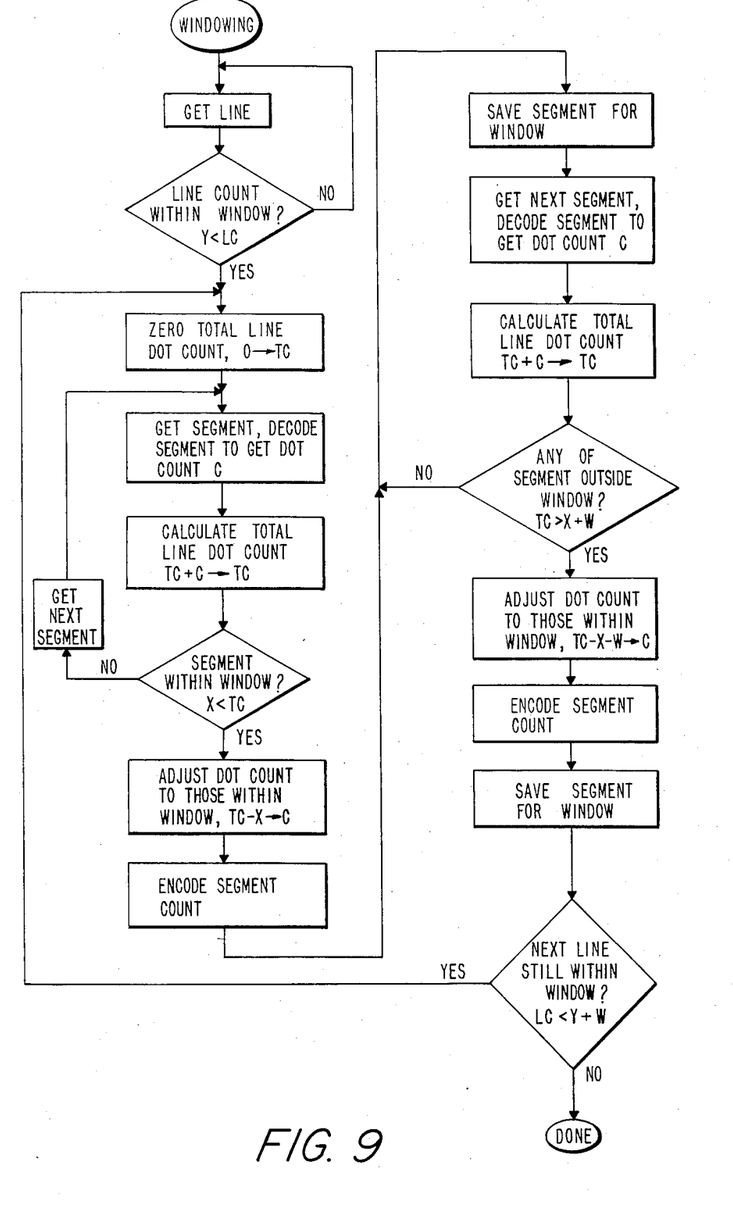
FIG. 9 is a flow chart of the method of the present invention for manipulating windows using compressed image data.

As each horizontal line that falls within the window is manipulated, the code for each line segment is converted back into a dot count of x displacement and accumulated. When the accumulated dot count exceeds X (the beginning of the window in the horizontal direction), the (dark or light) remainder of the count within the segment is converted to a compressed code with the color (dark or light) being the same as that for the whole segment which first falls within the window. For the following segments the accumulation of the count continues. As long as the accumulated count remains less than X+W, the compressed image code is used unchanged. When a segment's dot count makes the accumulated x displacement dot count greater than X+W, the segment's dot count is reduced by the amount that the accumulated total exceeds X+W and the result is converted back into a compressed code for a segment of the same color (dark or light). FIG. 9 illustrates a flow chart for windowing using compressed image data.

The windowing process in conjunction with resolution change may be used in many ways to put pieces of images together, open a space within an image, etc. as well as simply cutting out a rectangular piece of a larger image.

DECOMPRESSION OF COMPRESSED IMAGE DATA

When decompressing compressed image data of text or graphic images consisting primarily of background dots, a good deal of time can be saved by presetting the dot pattern image memory to the background dot state (binary ONEs or ZEROs) so that long strings of background dots simply require advancing the memory address over them without having to write individual dots to the background state. This can be accomplished by modifying current dynamic random access memory designs so that a row of memory chips can be reset simultaneously to the background dot state.

OTHER ENHANCEMENTS

Although the above discussion has been in terms of compressing the image data by coding the horizontal row information, the present invention is equally applicable if the image data is compressed by coding vertical column information.

Although the above discussion has been primarily in terms of manipulating two-dimensional images with equal resolution contraction or expansion in both dimensions, the present invention is equally applicable to three-dimensional images and to different ratios of resolution contraction or expansion being done in each dimension.

Although the above discussion has been in terms of manipulating compressed monochrome images of light and dark dots, the present invention is equally applicable to compressed polychrome images.

While the invention has been shown and described with reference to the preferred embodiment thereof, it will be understood by those skilled in the art that the above and other changes in form and detail may be made therein without departing from the spirit and scope of the invention.

What is claimed is:

1. A method for changing the horizontal resolution of a stored image while in compressed image data form, wherein the image data is originally represented as pixels in lines and columns of adjacent pixels, and wherein the image data in binary format is compressed by encoding the image data for each line of pixels such that all adjacent pixels having the same binary value are grouped and each group represented by a binary code indicating the particular binary value and a binary number indicating the number of pixels in each group, and comprising the steps of:

A. setting a cumulative fractional residue to zero in an incrementing and decrementing counter;
   B. reading out of storage the compressed image data for one line of the image at a time;
   C. multiplying the compressed image data representing each group of adjacent pixels having the same binary value within said one line at a time of the image by a number indicating the degree of horizontal resolution change desired in the image to get a changed pixel count which is the new number of pixels in each group of adjacent pixels having the same binary value;
   D. adjusting said cumulative fractional residue such that when each of said changed pixel counts is a number having a whole integer and a fraction less than one-half, to round off the changed pixel count to the whole integer and add the deleted fraction to said cumulative fractional residue in said counter, and such that when each of said changed pixel counts is a number having a whole integer and a fraction greater than one-half to round off the changed pixel count to the next highest whole integer and subtract the deleted fraction from said cumulative fractional residue in said counter; and E. repeating steps B through D for each scan line of said compressed image.

2. The method of claim 1 further comprising the steps of:

F. Incrementing the value of said changed pixel count by one when said cumulative fractional residue equals or exceeds the value of plus one, and subtracting one from said cumulative fractional residue in said counter, and G. Decrementing the value of said changed pixel count by one when said cumulative fractional residue equals or exceeds the value of minus one, and adding one to said cumulative fractional residue in said counter.

3. A method for changing the vertical resolution of a stored image while in compressed image data form, wherein the image data is originally represented as pixels in lines and columns of adjacent pixels, and wherein the image data in binary format is compressed by encoding the image data for each line of pixels such that all horizontal adjacent pixels having the same binary value are grouped and each group represented by a binary code indicating the particular binary value and a binary number indicating the number of pixels in each group, and comprising the steps of:

A. reading out of storage compressed image data for a group of lines at a time of the scan lines making up said image;

B. replicating or eliminating compressed image data for certain scan lines within each group of lines read out of storage to respectively increase or decrease the vertical resolution of said image, the lines selected to be replicated or eliminated being selected based on the information content of the compressed image data in each of said scan lines; and C. repeating steps A and B until all groups of scan lines making up said image have been processed.

4. The method of claim 3 wherein the information content used for selecting lines to be replicated or eliminated is the ratio of the number of pixels representing only said image to the total number of pixels in the scan line.

5. The method of claim 4 wherein the groups of scan lines comprise pairs or triples of scan lines and lines within the pairs and triples are replicated or eliminated on the basis of said information content.

6. A method of performing windowing on an image stored in compressed image data form, wherein the image data is originally represented as pixels in lines and columns of adjacent pixels, and wherein the image data in binary format is compressed by encoding the image data for each line of pixels such that all horizontal adjacent pixels having the same binary value are grouped and each group represented by a binary code indicating the particular binary value and a binary number indicating the number of pixels in each group, and comprising the steps of:

A. identifying the line numbers of both the first and last lines of a window, and the pixel numbers of the first and last pixels of each scan line of the portion of said image to be displayed in said window, B. sequentially reading out of storage said compressed image data for each scan line making up said image, said data also including the line number of the scan line being read, C. comparing the scan line number of said data read out of said storage with the line numbers of the first and last lines to be displayed in said window, D. selecting for further processing only compressed image data for scan lines the line numbers of which are equal to or between the line numbers of said first and last lines of said window, E. comparing the pixel numbers of said first and last pixels with each of said binary numbers indicating the number of pixels in each group of adjacent pixels having the same binary number in each selected scan line to locate a first and a second group of pixels in each selected scan line in which are the pixels corresponding to said first and last pixels defining the left and right edge of said window, and F. modifying the binary number of said first and said second group of pixels in each selected scan line so that the modified binary numbers only indicate the number of pixels in said first and said second group of pixels in each selected scan line that is displayed inside of said window.

7. A method for changing the horizontal and vertical resolution of a stored image while in compressed image data form, wherein the image data is originally represented as ones of pixels in lines and columns of adjacent pixels, and wherein the image data in binary format is compressed by encoding the image data for each line of pixels such that all adjacent pixels having the same binary value are grouped and each group represented by a binary code indicating the particular binary value and a binary number indicating the number of pixels in each group, and comprising the steps of:

A. reading out of storage compressed image data for a group of lines at a time of the lines making up said image, B. replicating or eliminating compressed image data for certain lines within each group of lines read out of storage to respectively increase or decrease the vertical resolution of said image and make up a second plurality of lines, the lines selected to be replicated or eliminated being selected based on the information content of the compressed image data in each of said lines, C. setting a cumulative fractional residue to zero in an incrementing and decrementing counter;

D. multiplying the compressed image data representing each group of horizontal adjacent pixels having the same binary value within each scan line for each of said group of lines at a time by a number indicating the degree of horizontal resolution change desired in the image to get a changed pixel count which is the new number of pixels in each group of adjacent pixels having the same binary value, E. adjusting said cumulative fractional residue such that when each of said changed pixel counts is a number having a whole integer and a fraction less than one-half, to round off the changed pixel count to the whole integer and add the deleted fraction to said cumulative fractional residue in said counter, and such that when each of said changed pixel counts is a number having a whole integer and a fraction greater than one-half to round off the changed pixel count to the next highest whole integer and subtract the deleted fraction from said cumulative fractional residue in said counter, F. repeating steps C through E for each scan line of said group of lines of said stored, compressed image, and progressing to step G when this has been done, and G. returning to step A until all groups of scan lines making up said image have been processed.

* * * * *